B. O. JENKINS AND J. F. TRAYLOR.
BREATHER PLUG CHECK VALVE.
APPLICATION FILED JUNE 16, 1921.
1,432,187. Patented Oct. 17, 1922.
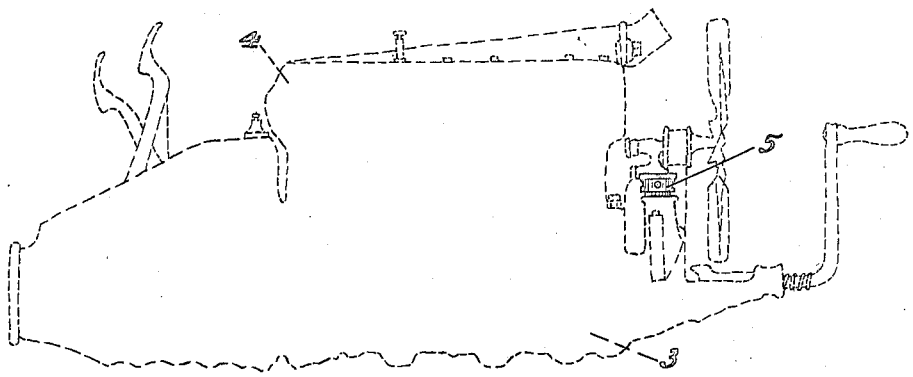
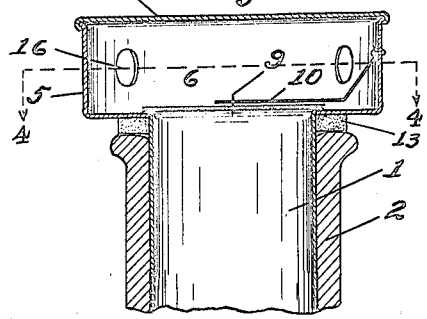
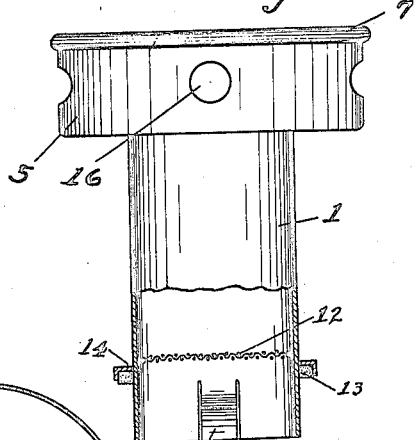
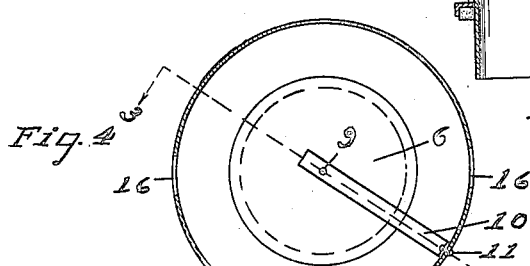
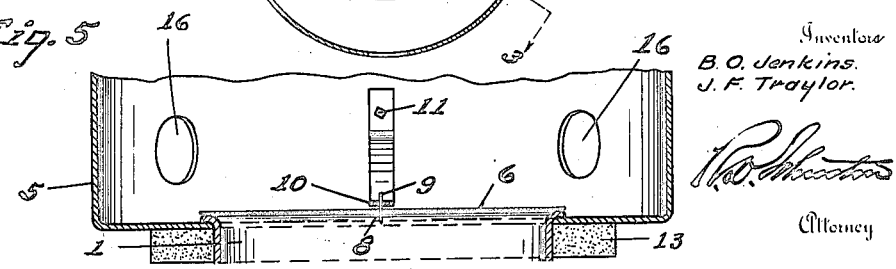
Inventors
B. O. Jenkins.
J. F. Traylor.
Attorney Patented Oct. 17, 1922.

1,432,187

UNITED STATES PATENT OFFICE.

BROOKS O. JENKINS AND JAMES F. TRAYLOR, OF ENSLEY, ALABAMA, ASSIGNORS, BY MESNE ASSIGNMENTS, TO CRAIG MANUFACTURING CO., OF ENSLEY, ALABAMA, A CORPORATION OF ALABAMA.

BREATHER-PLUG CHECK VALVE.

Application filed June 16, 1921. Serial No. 478,109.

*To all whom it may concern:*

Be it known that we, BROOKS O. JENKINS and JAMES F. TRAYLOR, citizens of the United States of America, residing at Ensley, in the county of Jefferson and State of Alabama, have invented certain new and useful Improvements in Breather-Plug Check Valves, of which the following is a specification.

Our invention relates to a check valve attachment for the crank cases of internal combustion engines which will produce automatically therein a partial vacuum sufficient to prevent the leakage of lubricating oil therefrom.

It has been long recognized that it would be highly advantageous to maintain a slight vacuum in the crank case so that all wastage or leakage of the lubricating oil therefrom would be definitely prevented, but heretofore this has been attempted only by the provisions of a suction connection from the intake manifold to the crank case. The objections to such a connection are manifold, chief among which being that it requires skilled labor to attach it, and it will discharge into the fuel mixture in the manifold burned gases, fumes, air and oil vapors in uncontrolled amount from the crank case.

Our invention contemplates a simple and inexpensive attachment capable of functioning automatically, which can be applied without skilled labor or expense to the breather plug opening or any suitable opening or openings of an automobile motor crank case, and which will so function as to maintain within the crank case under running conditions a sufficient vacuum to prevent the leakage therefrom of the lubricating oil.

More particularly our invention contemplates an improved type of breather plug, having incorporated therein a light vibratory check valve so designed, mounted and limited in its play that it will close quickly enough to enable the moving pistons to produce and maintain a slight vacuum in the crank case, this being accomplished automatically and without appliances liable to be worn, injured, or broken in normal use.

Our invention in a typical embodiment for use in Ford automobile motors is illustrated in the accompanying drawings, but it is to be understood that our invention may be modified for use with any other type of motor.

Referring to the drawings:—

Fig. 1 illustrates in dotted outline a motor having our invention in the form of a breather plug shown in full lines mounted therein.

Fig. 2 is a side elevation enlarged of the breather plug with a different type of sleeve.

Fig. 3 is a vertical section taken on the line 3—3 of Fig. 4.

Fig. 4 is a horizontal cross sectional view taken on the line 4—4 of Fig. 3.

Fig. 5 is an enlarged vertical sectional view taken at right angles to the plane 3—3 of Fig. 4.

Like numerals refer to like parts throughout.

In the typical embodiment of our invention illustrated, but to the details of which we do not confine our invention, we show a breather plug such as is now in general use on Ford automobiles, this plug comprising a tubular sleeve 1 adapted to fit snugly into the breather opening 2 of the crank case 3 of the motor 4. The sleeve 1 is suitably connected concentrically to the bottom of an enlarged body 5 preferably by a bead joint with the bead standing slightly above the bottom and accurately arranged to form an annular seat for a check valve 6.

This check valve 6 is formed by a very thin light metal disk, those we have used being from four-thousandths to five-thousandths of an inch thick. While we do not desire to limit ourselves to this particular thickness of the disk, it is mentioned to emphasize the fact that the valve must be sufficiently light and sensitive so that it will vibrate with a minimum of inertia so as to close the breather plug opening quickly enough to prevent the intake of sufficient air into the crank case therethrough to overcome a partial vacuum maintained therein by the piston action. The body of the breather plug is provided with side air escape ports 16 and has a top 7 connected by a bead joint to the body. The valve has a central guide opening 8 arranged for a snug sliding engagement on a vertical pin 9 secured in a bracket 10 which is suitably fastened to the body as by bolts 11. The bracket leaves but a very small clearance (we allow about $\frac{1}{32}''$ clearance) above the valve so as to limit the opening stroke of the valve which is guided with negligible friction by the pin 9. When the motor is in service the valve vibrates responsive to the pulsations induced by the piston strokes, seating itself in such relation to each piston stroke as in cooperation with the pistons to produce and maintain the requisite partial vacuum.

As heretofore stated we do not limit our invention to the particular type of sensitive vibratory check valve as various other types may be selected which will function in accordance with the principles of our invention, but as required by law we have illustrated that type which we have found most practical.

In Fig. 2 the sleeve 1 is elongated and provided at its lower end with a coarse wire screen 12 to prevent tampering with the valve 6. The felt washer 13 may be applied as in Fig. 2, or under the flange 14 which is fast on the sleeve just above the spring tongues 15 which insure a tight fit.

The valves will function to prevent grit or dust entering the crank case to any appreciable extent.

Having thus described our invention, what we claim as new and desire to secure by Letters Patent, is:—

1. An attachment for internal combustion engines, comprising a sensitive check valve adapted to be snugly fitted into the usual breather tube opening of the crank case of an engine, said valve being constructed and arranged to readily admit of the free outward discharge of vapour from the crank case and to prevent the ingress of air to the latter after each discharge of vapour therefrom.

2. An attachment for internal combustion engines, comprising a valve formed of a thin light weight and imperforate vibratory disk adapted to be mounted on and for co-operation with the usual breather tube whereby to readily admit of the free discharge of vapour out of the breather tube from the crank case and to quickly seat itself in a manner to prevent the ingress of air to the latter after each discharge of vapour therefrom, means for guiding said valve, and means for limiting the vibratory travel of said valve to a very short stroke.

3. An attachment for internal combustion engines, comprising a casing adapted to be snugly fitted into the usual breather tube opening of the crank case of an engine, a valve formed of a thin light weight and imperforate disk mounted within said casing whereby to be operated by the breathing pulsations of the engine in a manner to readily admit of the outward discharge of vapour from the crank case and to quickly seat itself to prevent the ingress of air to the latter after each discharge of vapour therefrom, means disposed within said casing for accurately guiding said valve, and means for limiting the vibratory travel of said valve to a very short stroke.

4. An attachment for internal combustion engines, comprising a casing adapted to be snugly fitted into the usual breather opening of the crank case of an engine, an enlarged portion formed at the outer end of said casing and adapted to seat over the outer end of the said breather opening, a valve formed of a thin light weight and imperforate vibratory disk mounted within the enlarged portion of said casing whereby to readily admit of the outward discharge of vapour from the crank case of an engine and to quickly seat itself in a manner to prevent the ingress of air to the latter after each discharge of vapour therefrom, means for guiding said valve, and means carried by the side wall of the enlarged portion of said casing and supporting said guiding means in position.

5. An attachment for internal combustion engines, comprising a tubular casing adapted to be snugly fitted into the usual breather tube opening of the crank case of an engine, an enlarged portion connected by a beaded joint to the upper outer end portion of said tubular casing, said beaded joint being disposed within the enlarged portion of said casing and arranged to provide a valve seat, a valve formed of a thin light weight and imperforate vibratory disk mounted within the enlarged portion of said casing whereby to readily admit of the outward discharge of vapour from the crank case and to quickly seat itself on the said seat in a manner to prevent the ingress of air to the latter after each discharge of vapour therefrom, a bracket extending radially inward from the side wall of the enlarged portion of said casing, and means carried by said bracket for accurately guiding said valve in its vibratory travel, said bracket acting to limit such travel of the valve to a very short stroke.

6. A device for reducing the leakage of oil from, and the access of road dust to the crank case of an explosive engine, comprising means responsive to the breathing functions of the engine and adapted to prevent the inflow of replacement air into the crank case sufficiently to create a partial vacuum therein.

7. A device for reducing the leakage of oil from, and the access of road dust to the crank case of an explosive engine, comprising light sensitive check valve means responsive to the breathing functions of the engine and adapted to prevent the inflow of replacement air into the crank case sufficiently to create a partial vacuum therein.

8. The hereindescribed process for reducing oil leakage from, and the access of dust into the crank case of an internal combustion engine, which consists in closing the breather port of the crank case in advance of the completion of the intake phase of the breathing functions of the engine to thereby reduce and maintain a partial vacuum in the crank case.

9. A vacuum inducing and dust excluding closure for a breather opening for the crank case of an internal combustion engine, comprising check valve means adapted to vibrate freely responsive to and in synchronism with the pulsations through said opening, and being sufficiently light and free of inertia to seat and close said opening to prevent the ingress of air to the crank case in advance of the completion of the intake or suction phase of a pulsation.

10. A breather plug for the crank case of an internal combustion engine, comprising a check valve chamber, check valve means in the chamber so light and sensitive as to be adapted to open freely responsive to any appreciable outflow of vapor through the plug and to seat to prevent the ingress of any succeeding inflow of replacement air, thereby to induce a partial vacuum in the crank case.

11. A device for reducing the leakage of oil from, and the access of road dust into the crank case of an explosive engine, comprising a port opening through the crank case of an engine and of a size sufficient to admit of the free exhaust of vapor from the crank case with each breathing pulsation of the engine, a single thin metal disk valve adapted to seat over and close said port to prevent the ingress of replacement air to the crank case, means to guide the valve, and stop means to limit the valve's opening movement to that sufficient for a free exhaust of the vapor.

In testimony whereof we affix our signatures.

BROOKS O. JENKINS.
JAMES F. TRAYLOR.

Witness:
NOMIE WELSH.